United States Patent
Okubo et al.

(10) Patent No.: US 11,835,766 B2
(45) Date of Patent: Dec. 5, 2023

(54) SLOPE GAIN EQUALIZER

(71) Applicant: KOHOKU KOGYO CO., LTD., Nagahama (JP)

(72) Inventors: Toshihisa Okubo, Nagahama (JP); Takashi Kato, Nagahama (JP)

(73) Assignee: KOHOKU KOGYO CO., LTD., Nagahama (JP)

( * ) Notice: Subject to any disclaimer, the term of this patent is extended or adjusted under 35 U.S.C. 154(b) by 0 days.

(21) Appl. No.: 17/771,812

(22) PCT Filed: Sep. 11, 2020

(86) PCT No.: PCT/JP2020/034528
§ 371 (c)(1),
(2) Date: Apr. 26, 2022

(87) PCT Pub. No.: WO2021/084938
PCT Pub. Date: May 6, 2021

(65) Prior Publication Data
US 2022/0373741 A1 Nov. 24, 2022

(30) Foreign Application Priority Data
Oct. 29, 2019 (JP) .................................. 2019-196197

(51) Int. Cl.
G02B 6/293 (2006.01)
H04B 10/294 (2013.01)
G02B 6/32 (2006.01)

(52) U.S. Cl.
CPC ........... *G02B 6/29361* (2013.01); *G02B 6/32* (2013.01); *H04B 10/294* (2013.01);
(Continued)

(58) Field of Classification Search
CPC .............. G02B 6/293; G02B 6/29361; G02B 6/29362; G02B 6/32; H04B 10/25; H04B 10/294; H04B 10/2941
See application file for complete search history.

(56) References Cited

U.S. PATENT DOCUMENTS 6,408,115 B1 * 6/2002 McIntyre ............. G02B 6/2937
385/33
6,483,631 B1 11/2002 Cheng et al.
(Continued)

FOREIGN PATENT DOCUMENTS

CN 1224175 A * 7/1999 ............... G02F 1/09
CN 103885177 A * 6/2014 ............. G02B 26/08
(Continued)

OTHER PUBLICATIONS

Japanese Office Action for Application No. 2019-196197 dated Apr. 4, 2023.
(Continued)

*Primary Examiner* — Daniel Petkovsek
(74) *Attorney, Agent, or Firm* — Isshiki & Partners; Joseph P. Farrar, Esq.

(57) ABSTRACT

A slope gain equalizer that corrects a slope of a gain characteristic of an optical signal in a predetermined wavelength bandwidth. An interference filter, which allows insertion losses in a predetermined wavelength region to be inclined in opposite directions between a transmitting direction and a reflecting direction from a short wavelength side to a long wavelength side, is arranged between a dual-core fiber collimator and a single-core fiber collimator facing each other on an optical axis. An optical signal of a predetermined bandwidth inputted from a first or second optical fiber held by the dual-core fiber collimator is reflected by the interference filter and outputted from the second or the first optical fiber. An optical signal inputted from a third optical (Continued)

fiber held by the first optical fiber or the single-core fiber collimator is transmitted through the interference filter and outputted from the third or the first optical fiber.

4 Claims, 8 Drawing Sheets

(52) U.S. Cl.
CPC ......... *H04B 10/2941* (2013.01); *G02B 6/293* (2013.01); *G02B 6/29362* (2013.01)

(56) References Cited

U.S. PATENT DOCUMENTS

| | | | | |
|---|---|---|---|---|
| 7,346,236 | B2 * | 3/2008 | Asano | G02B 6/2937 385/39 |
| 2007/0211993 | A1 * | 9/2007 | Hashizume | G02B 6/2937 385/24 |
| 2013/0330039 | A1 | 12/2013 | Liu et al. | |

FOREIGN PATENT DOCUMENTS

| | | | | |
|---|---|---|---|---|
| JP | 2003131065 | A * | 5/2003 | ............ G02B 6/26 |
| JP | 2003172806 | A | 6/2003 | |
| JP | 2010217236 | A | 9/2010 | |
| WO | 2018208691 | A1 | 11/2018 | |

OTHER PUBLICATIONS

"Construction Technology for Use in Repeatered Transoceanic Optical Submarine Cable Systems" retrieved online on Sep. 24, 2019 at https://www.nec.com/en/global/techrep/journal/g10/n01/pdf/100110.pdf.

"The Optical Submarine Repeater and Its Associated Technologies" retrieved online on Sep. 24, 2019 at https://www.nec.com/en/global/techrep/journal/g10/n01/pdf/100104.pdf.

"Gain-Flattening Filters Using Dielectric Multilayer Thin Film" retrieved online on Sep. 24, 2019 at https://www.furukawa.co.jp/review/fr021/fr21_03.pdf.

Written Opinion of the International Search Authority for Application No. PCT/JP2020/034528 dated Oct. 27, 2020.

Partial translation of Written Opinion of the International Search Authority for Application No. PCT/JP2020/034528 dated Oct. 27, 2020.

International Search Report (ISR) for Application No. PCT/JP2020/034528 dated Oct. 12, 2020.

English Translation of the International Search Report (ISR) for Application No. PCT/JP2020/034528 dated Oct. 2, 2020.

* cited by examiner

SLOPE GAIN EQUALIZER

CROSS-REFERENCE TO RELATED APPLICATIONS

The present application is a national phase entry under 35 U.S.C. § 371 of International Application No. PCT/JP2020/034528, filed Sep. 11, 2020, which claims priority from Japanese Application No. 2019-196197, filed Oct. 29, 2019, the entire disclosures of which are hereby incorporated by reference herein.

TECHNICAL FIELD

The present invention relates to a slope gain equalizer.

BACKGROUND ART

A transmission line of an optical signal (optical transmission line) in an optical fiber communication system such as a submarine optical cable system is constructed by coupling large and long optical fiber cables by many repeaters. In the optical transmission line, an erbium-doped optical fiber amplifier (EDFA) for amplifying an optical signal that is damped during a process of propagating through the optical fiber cables is disposed. Additionally, when the optical signal is amplified by the EDFA or during the process of propagating through the optical transmission line, the wavelength dependence occurs in a gain; for this reason, there is disposed in the optical transmission line a gain equalizer for correcting the wavelength dependence of the gain of the optical signal. Incidentally, a submarine optical cable system is described in the following NPL 1 and NPL 2. Additionally, a gain equalizer using a dielectric multilayer is described in the following NPL 3.

CITATION LIST

Non-Patent Literature

NPL 1 NEC Corporation, "Construction Technology of Transoceanic Submarine Optical Cable System with Repeater", [online], [accessed Sep. 24, 2019], Internet jpn.nec.com/techrep/journal/g09/n04/pdf/090410

NPL 2 NEC Corporation, "Submarine Optical Repeater and Related Technologies", [online], [accessed Sep. 24, 2019], Internet jpn.nec.com/techrep/journal/g09/n04/pdf/090404

NPL 3 Furukawa Electric Co., Ltd., "Gain-flattening Filters Using Dielectric Multilayer Films", [online], [accessed Sep. 24, 2019], Internet www.furukawa.co.jp/jiho/fj109/fj109_04

SUMMARY OF THE INVENTION

Technical Problem

As described in NPL 1, a gain equalizer includes a shape equalizer that corrects ripples of the gain of the optical signal accumulated during the process of propagating through the optical transmission line, and a tilt equalizer that corrects a slope of the gain (hereinafter, referred to as a slope gain equalizer). The ripples of the gain corrected by the shape equalizer can be identified based on a gain shape of an amplification bandwidth in a repeater. Accordingly, the specification of the shape equalizer can be decided in advance by a simulation.

However, the slope state (slope direction, magnitude of slope, and the like) of the gain in the optical signal is determined by measuring the characteristics of the repeater and the optical fiber cable manufactured in actuality. For this reason, the specification of the slope gain equalizer is decided after the slope state of the gain in the optical signal (hereinafter, referred to as a slope gain characteristic in some cases) is determined. Otherwise, a wide variety of slope gain equalizers different in correction characteristics need to be prepared in advance correspondingly to the various slope gain characteristics.

In a case where the specification of the slope gain equalizer is decided after the slope gain characteristic is determined, it is difficult to construct an optical fiber communication system in a short period of time. If a wide variety of slope gain equalizers are prepared in advance, the time for deciding the specification can be shortened, and the optical fiber communication system can be constructed in a short period of time; however, on the other hand, slope gain equalizers that are not used in actuality need to be managed as stocks. For this reason, there are costs with the stock management of the slope gain equalizers. Additionally, the manufacturing cost of the slope gain equalizers not used causes an increase in the construction cost of the optical fiber communication system.

To deal with this, an object of the present invention is to provide a slope gain equalizer that is capable of reducing costs with stock management and constructing an optical fiber communication system with lower cost.

Solution to the Problem

An aspect of the present invention to achieve the above object is a slope gain equalizer that corrects an inclined gain characteristic in an optical signal in a predetermined wavelength bandwidth, comprising: a dual-core fiber collimator that holds a first optical fiber and a second optical fiber; a single-core fiber collimator that holds a third optical fiber; and an interference filter, wherein the dual-core fiber collimator and the single-core fiber collimator are arranged to face each other on an optical axis, the interference filter is arranged between the dual-core fiber collimator and the single-core fiber collimator on the optical axis, the interference filter is inclined such that an insertion loss in a transmitting direction and an insertion loss in a reflecting direction in a predetermined wavelength region are in opposite directions from each other from a short wavelength side to a long wavelength side, when an optical signal of a predetermined bandwidth is inputted from the first optical fiber or the second optical fiber, the optical signal is reflected by the interference filter and is outputted from the second optical fiber or the first optical fiber, when the optical signal is inputted from the first optical fiber or the third optical fiber, the optical signal is transmitted through the interference filter and is outputted from the third optical fiber or the first optical fiber, and the first to the third optical fibers are coupled to an input-output route of the optical signal such that a slope of a wavelength dependence characteristic of a gain characteristic in the optical signal and a slope of a wavelength dependence characteristic of the insertion loss in the interference filter are in opposite directions.

Advantageous Effects of the Invention

According to the present invention, a slope gain equalizer that is capable of reducing costs with stock management and constructing an optical fiber communication system with lower cost is provided. Note that, other effects are disclosed in the following descriptions.

DETAILED DESCRIPTION OF EMBODIMENTS

Examples of the present invention are described below with reference to the appended drawings. Note that, in the drawings used for the following descriptions, duplicated descriptions may be omitted by assigning the same reference signs to the same or similar parts. A part assigned with a reference sign in one drawing may not be assigned with a reference sign in another drawing if it is unnecessary.

First Example

Figure 1:
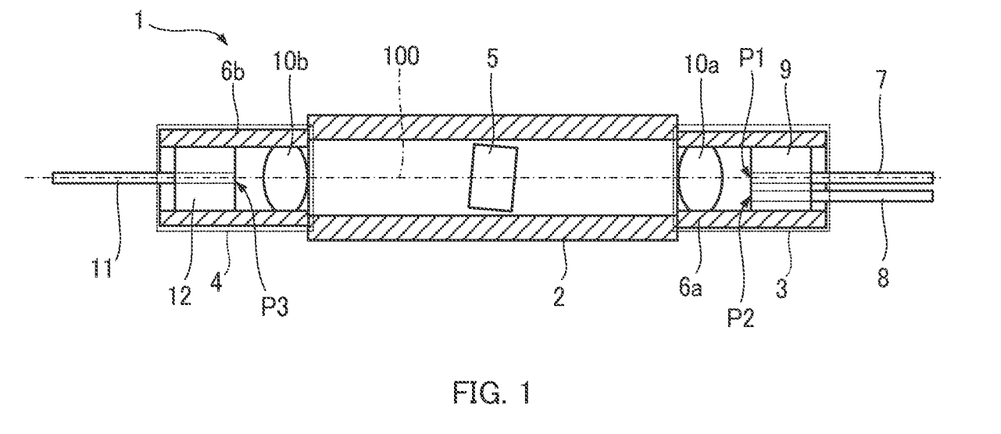
FIG. 1 is a diagram illustrating a configuration of a slope gain equalizer according to a first example of the present invention.

FIG. 1 is a diagram illustrating a configuration of a slope gain equalizer 1 according to a first example of the present invention. The slope gain equalizer 1 illustrated in FIG. 1 includes a dual-core fiber collimator 3 coupled on one end side of a hollow tubular housing 2, a single-core fiber collimator 4 coupled on the other end side of the housing 2 to be coaxial with an optical axis 100 of the dual-core fiber collimator 3, and an interference filter 5 arranged between the two collimators (3 and 4) on the optical axis 100 in the housing 2.

The dual-core fiber collimator 3 and the single-core fiber collimator 4 are arranged coaxially on the optical axis 100. The dual-core fiber collimator 3 has a structure in which a ferrule 9 holding two optical fibers (7 and 8) and a collimating lens 10a are held in a hollow cylindrical sleeve 6a to be coaxial with the sleeve 6a. The optical fibers (7 and 8) each include an opening end (hereinafter, referred to as a first port P1 and a second port P2 in some cases) on a housing 2 side.

The single-core fiber collimator 4 has a structure in which a ferrule 12 holding a single optical fiber 11 and a collimating lens 10b are held in a hollow cylindrical sleeve 6b to be coaxial with the sleeve 6b. The optical fiber 11 includes an opening end (hereinafter, referred to as a third port P3 in some cases) on a housing 2 side. Additionally, in the slope gain equalizer 1 according to the first example, the first port P1 and the third port P3 are arranged on the optical axis 100.

Note that, hereinafter, the optical fiber 7 in which the first port P1 is an opening end is referred to as a first optical fiber 7, the optical fiber 8 in which the second port P2 is an opening end is referred to as a second optical fiber 8, and the optical fiber 11 in which the third port P3 is an opening end is referred to as a third optical fiber 11.

The interference filter 5 is formed by forming an interference film including a dielectric multilayer on a surface of a substrate made of quartz glass or the like. A dielectric thin film forming the dielectric multilayer is made of $Ta_2O_5$, $SiO_2$, and the like. Additionally, as also described in the above-described NPL 3, a wavelength dependence characteristic (hereinafter, referred to as an optical characteristic in some cases) of an insertion loss in the interference filter 5 can be appropriately set based on a simulation. That is, a parameter (for example, a refractive index, thickness, and the like of material forming the substrate and the dielectric multilayer) related to the configuration and the structure of an interference filter required to obtain the interference filter 5 that has a desired optical characteristic can be obtained by a simulation.

Figure 2:
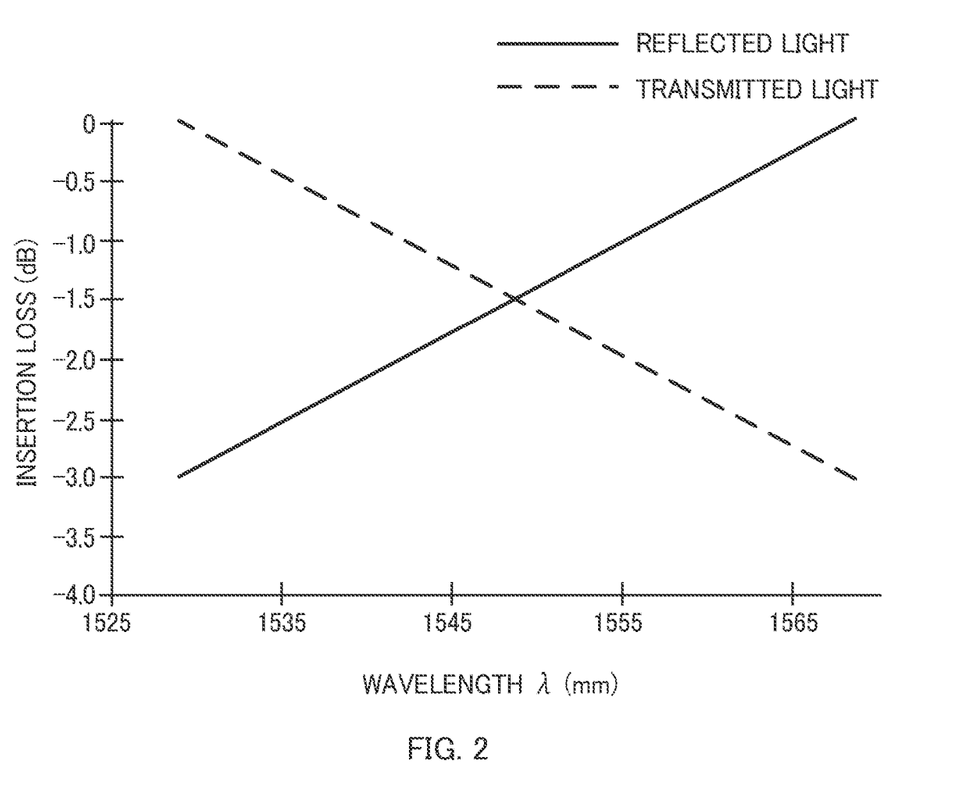
FIG. 2 is a diagram illustrating an example of an optical characteristic of an interference film formed in an interference filter included in the slope gain equalizer according to the above-described first example.

FIG. 2 illustrates an example of the optical characteristic of the interference film formed in the interference filter 5. In FIG. 2, the wavelength dependence of an insertion loss of each of transmitted light and reflected light when light of a wavelength bandwidth of C-band used in wavelength multiplexing optical communication enters the interference film is illustrated. Note that, as is widely known, the wavelength dependencies of the wavelength loss characteristics of the reflected light and the incident light of the light that enters the interference film have a relationship of complementing each other. In the example illustrated in FIG. 2, the optical characteristic of the interference film is set such that, as indicated by a solid line in FIG. 2, the insertion loss of the reflected light is increased linearly by about 3 dB along with an increase in the wavelength. The insertion loss of the transmitted light is set so as to be, as indicated by a broken line in FIG. 2, decreased linearly by about 3 dB along with an increase in the wavelength. Thus, the interference film formed in the interference filter 5 of the slope gain equalizer 1 according to the first example is set such that the insertion loss of the reflected light and the insertion loss of the transmitted light along with an increase in the wavelength have the same magnitude in each slope (slope angle) in the opposite slope directions.

Figure 3A:
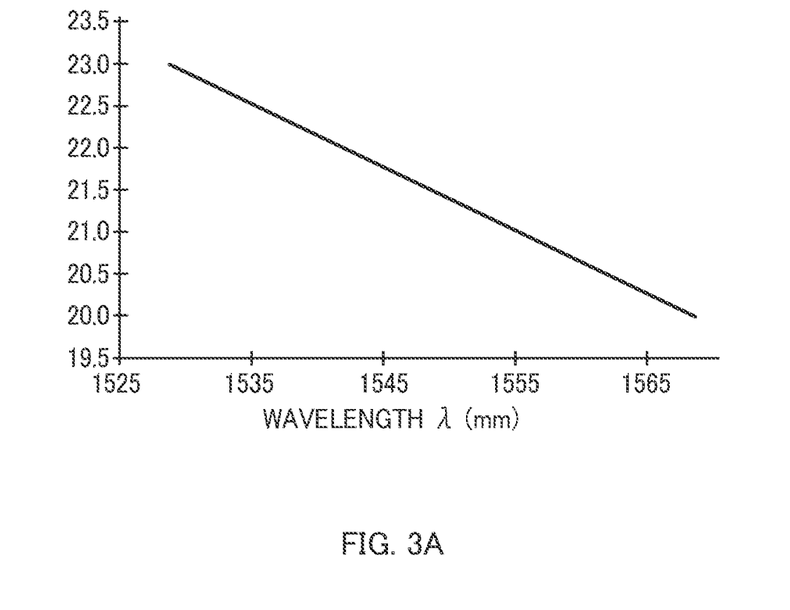
FIG. 3A is a diagram illustrating an example of a slope gain characteristic of an optical signal inputted to the slope gain equalizer according to the above-described first example.
Figure 3B:
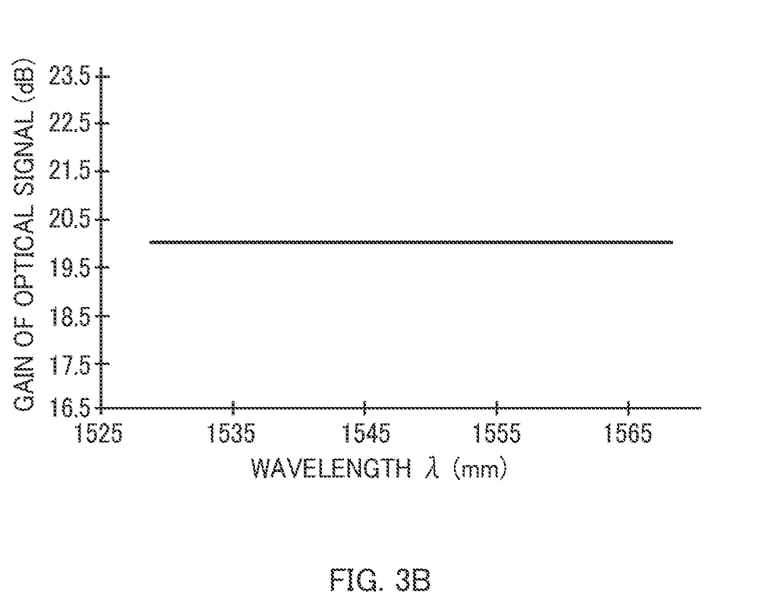
FIG. 3B is a diagram illustrating the gain characteristic of the optical signal after the correction by the slope gain equalizer according to the above-described first example.
Figure 4:
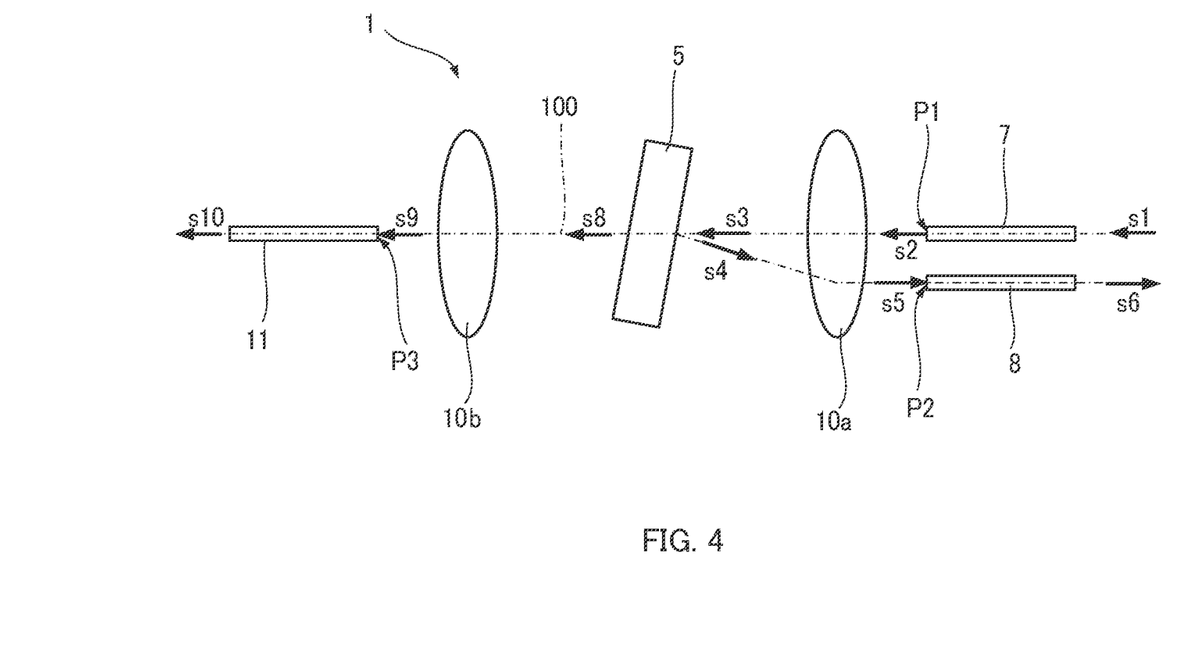
FIG. 4 is a diagram illustrating an optical path of the optical signal inputted and outputted to and from the slope gain equalizer according to the above-described first example.

FIG. 3A and FIG. 3B are diagrams illustrating the correction principle of a slope gain characteristic of an optical signal by the slope gain equalizer 1. FIG. 3A illustrates an example of the slope gain characteristic of an optical signal inputted to the slope gain equalizer 1. FIG. 3B is a diagram illustrating the gain characteristic of the optical signal after the correction. FIG. 4 illustrates an optical path of the optical signal inputted and outputted to and from the slope gain equalizer 1. With reference to FIG. 3A, FIG. 3B, and FIG. 4, operations of the slope gain equalizer 1 according to the first example is described below assuming that the optical characteristic of the interference filter 5 is the same as the optical characteristic of the interference film illustrated in FIG. 2.

A gain of the optical signal illustrated in FIG. 3A has a characteristic of being inclined to be increasing as linearly decreasing by about 3 dB along with an increase in the wavelength. The slope gain equalizer 1 corrects this optical signal so as to obtain a flat gain characteristic in which the strength is constant from a short wavelength to a long wavelength. In this case, as illustrated in FIG. 2, the insertion loss of the interference filter 5 has a characteristic of linearly decreasing from the short wavelength side to the long wavelength side by about 3 dB in the reflected light; for this reason, in a case of correcting an optical signal having the slope gain characteristic illustrated in FIG. 3A, the optical signal is reflected by the interference filter 5, and the reflected light is outputted.

For example, as illustrated in FIG. 4, an input route of the optical signal is coupled to the first optical fiber, and the optical signal inputted to the first optical fiber 7 is emitted from the first port P1 (s1→s2), and also the optical signal is allowed to enter the interference filter 5 via the collimating lens 10a (s3). In the interference filter 5, an incidence plane of the light is inclined at a predetermined angle with respect to the optical axis 100, and the second port P2 is arranged on an optical path (s5) to which a reflected light (s4) from the interference filter 5 is coupled by the collimating lens 10a. With this, the optical signal (sl) inputted to the first optical fiber 7 is outputted from the second optical fiber 8 (s6). Then, as illustrated in FIG. 3B, the optical signal inputted to the slope gain equalizer 1 is outputted while the strength is in a state of being flattened in a predetermined wavelength bandwidth.

Note that, in a case where the slope gain characteristic of the optical signal has a characteristic of "increasing" as an increase from the short wavelength side to the long wavelength side, the optical signal is transmitted through the interference filter 5 such that the optical path is formed along the optical axis 100. That is, in FIG. 4, the optical signal inputted to the first optical fiber 7 is emitted from the first port P1 (s1→s2), and the emitted light is allowed to enter the interference filter 5 via the collimating lens 10a (s3). Then, the light transmitted through the interference filter 5 is coupled to the third port P3 by the collimating lens 10b (s8→s9), and the optical signal after the correction is outputted from the third optical fiber 11 (s10).

Thus, according to the slope gain equalizer 1 according to the first example, regardless of the direction in which the slope gain characteristic of an optical signal is inclined from the short wavelength side to the long wavelength side, as long as the angles of the slopes are the same, the strength characteristic of the optical signal can be flattened by the single slope gain equalizer 1 regardless of the direction of the slope. That is, with the slope gain equalizer 1 according to the first example being employed for an optical fiber communication system, the number of the slope gain equalizers 1 that have been conventionally prepared individually for the direction of the slope and the angle of the slope in an optical signal can be reduced by half. That is, the slope gain equalizer 1 according to the first example can reduce costs with the stock management and can construct an optical fiber communication system with lower cost.

Second Example

FIG. 3A and FIG. 3B are diagrams that illustrate the operation principle of the slope gain equalizer 1 according to the first example and indicate that the optical characteristics of the interference filter 5 are symmetric between the reflected light and the transmitted light. However, the optical characteristic of the actual interference filter 5 reflects the optical characteristics of both the interference film and substrate; for this reason, if a wavelength dependence characteristic of either one of the insertion loss of the reflected light and the insertion loss of the transmitted light is set to be linearly increased or decreased, it is difficult to set the other wavelength dependence characteristic to be linearly decreased or increased.

Figure 5:
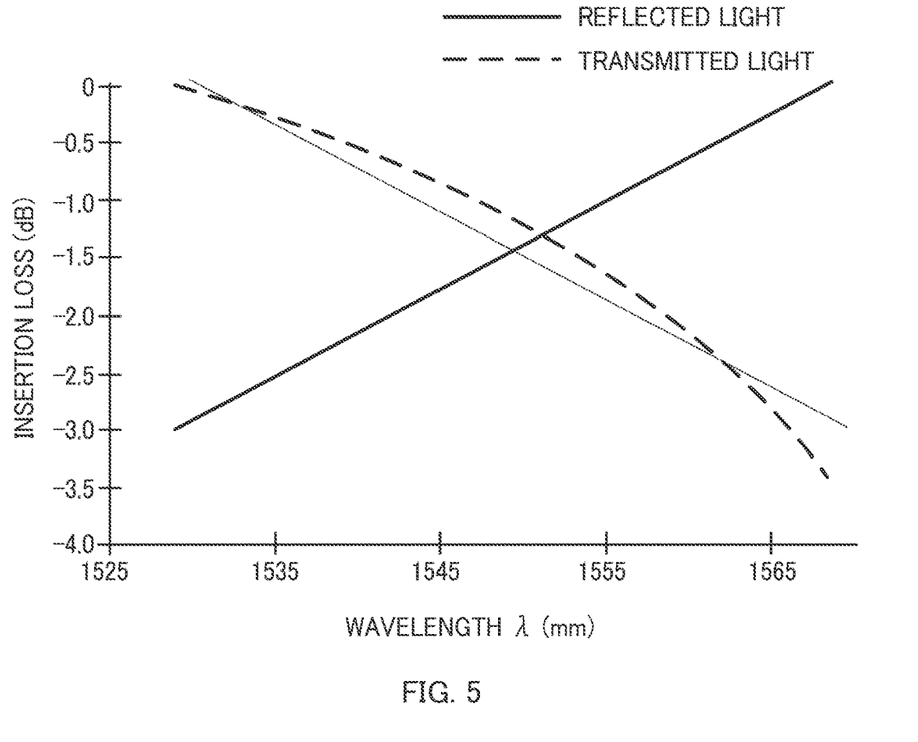
FIG. 5 is a diagram illustrating an example of an optical characteristic of the interference filter included in the slope gain equalizer according to the above-described first example.
Figure 6:
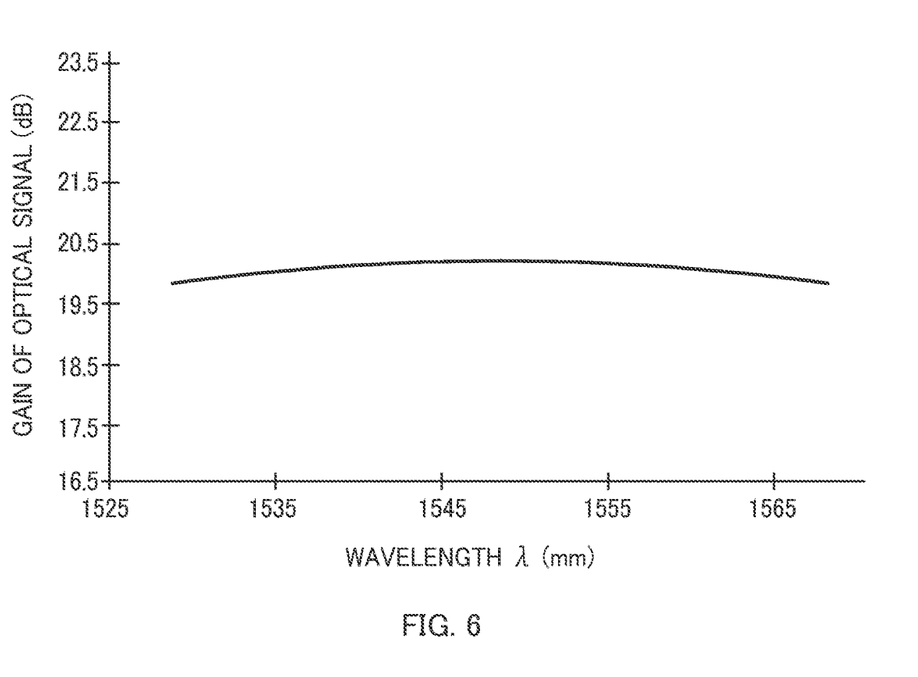
FIG. 6 is a diagram illustrating the gain characteristic of the optical signal corrected by the slope gain equalizer according to the above-described first example.

FIG. 5 illustrates an example of the optical characteristic of the actual interference filter 5. In the actual interference filter 5, in a case where the optical characteristic of the reflected light (in FIG. 5, solid line) is linearly increased along with the increase and decrease in the wavelength, the insertion loss of the transmitted light (in FIG. 5, broken line) is decreased so as to draw a curved line along with the increase and decrease in the wavelength and is deviated from a straight line (in FIG. 5, dotted line). To deal with this, with an optical signal having the increasing slope gain characteristic being inputted to the slope gain equalizer including the interference filter 5 having the optical characteristic illustrated in FIG. 5, as illustrated in FIG. 6, an optical signal having the gain characteristic of curving from the short wavelength side to the long wavelength side is outputted.

Even if the gain characteristic with respect to the wavelength of the optical signal after the correction is curved as mentioned above, it is no problem as long as the variation width of the gain is within a range defined by the specification of the optical fiber communication system. That is, it is no problem in practical use even if the insertion loss of the reflected light and the insertion loss of the transmitted light in the interference filter 5 are asymmetric.

As a matter of course, in either case where the slope gain characteristic of the optical signal is increasing or decreasing, it is more preferable if it is possible to output an optical signal of low gain variation and high flatness. Therefore, as a second example, here is described a slope gain equalizer that can output an optical signal of higher flatness regardless of the slope direction in the slope gain characteristic of the inputted optical signal even in a case where the insertion loss of the reflected light and the insertion loss of the transmitted light in the interference filter 5 are asymmetric.

Figure 7:
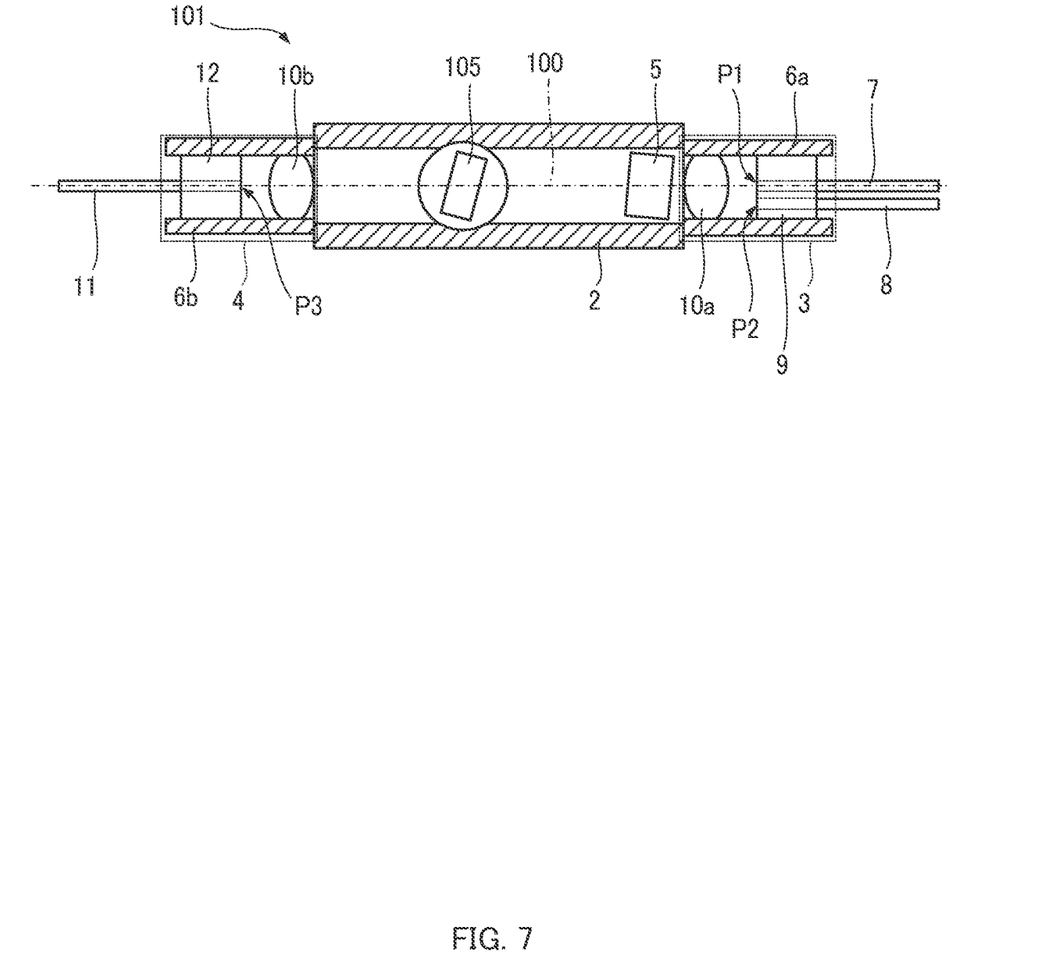
FIG. 7 is a diagram illustrating a configuration of a slope gain equalizer according to a second example of the present invention.

FIG. 7 is a diagram illustrating a configuration of a slope gain equalizer 101 according to the second example. As illustrated in FIG. 7, in the slope gain equalizer 101, two interference filters (5 and 105) are arranged between the first port P1 and the third port P3 along the optical axis 100. Then, in the slope gain equalizer 101 according to the second example, the interference filter 5 close to the first port P1 is the one having the optical characteristic illustrated in FIG. 2. On the other hand, the interference filter close to the third port P3 (hereinafter, referred to as a compensating interference filter 105 in some cases) is the one for further flattening the insertion loss characteristic of the transmitted light in the interference filter 5.

Figure 8:
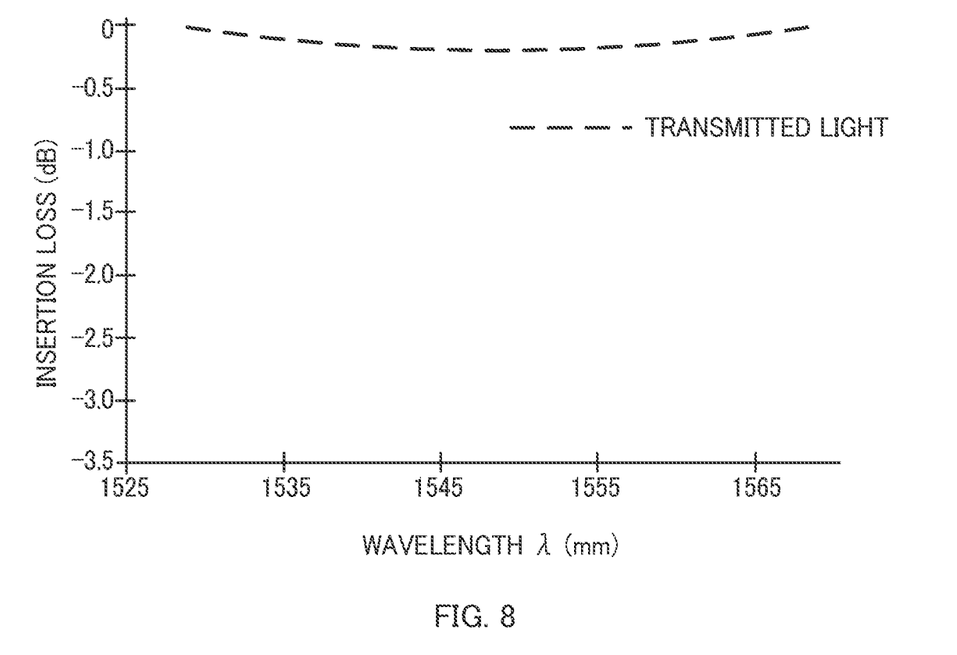
FIG. 8 is a diagram illustrating an optical characteristic of a compensating interference filter included in a slope gain equalizer 101 according to the above-described second example.
Figure 9:
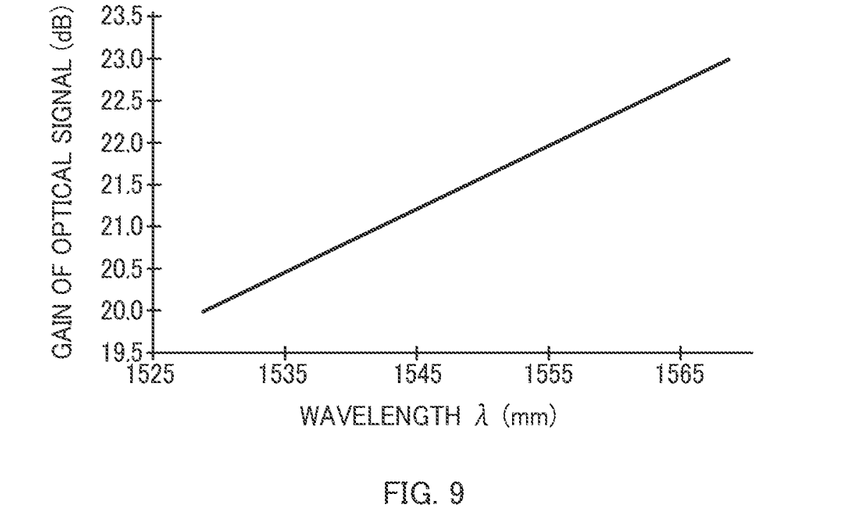
FIG. 9 is a diagram illustrating an example of a gain characteristic of an optical signal inputted to the slope gain equalizer according to the above-described second example.
Figure 10:
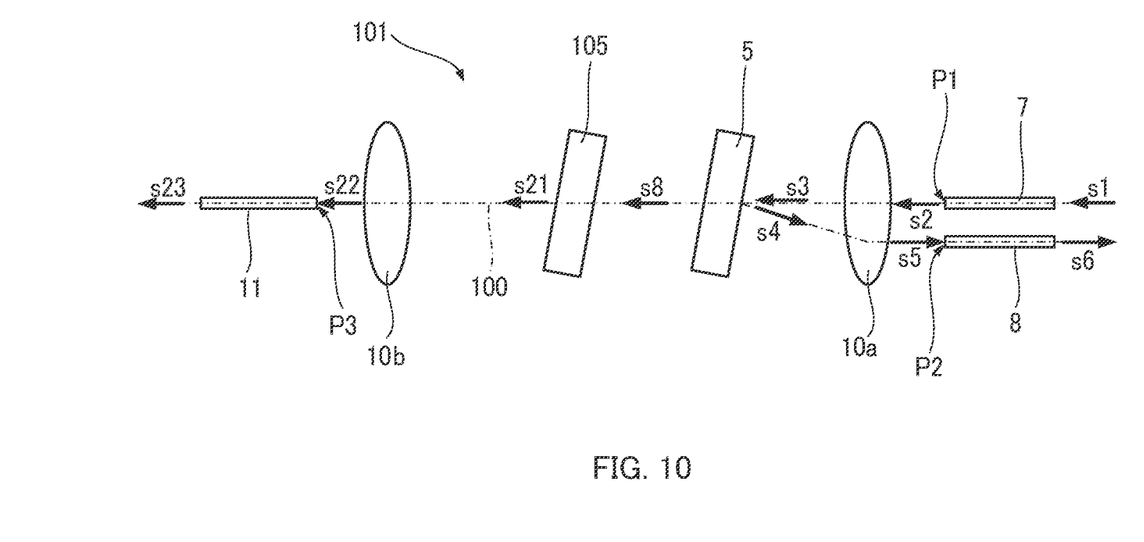
FIG. 10 is a diagram illustrating an optical path of the optical signal inputted and outputted to and from the slope gain equalizer according to the above-described second example.

FIG. 8 illustrates a wavelength dependence characteristic of the insertion loss of the transmitted light in the compensating interference filter 105. FIG. 9 illustrates a slope gain characteristic of an optical signal inputted to the slope gain equalizer 101 according to the second example, and as illustrated in FIG. 9, the optical signal inputted to the slope gain equalizer 101 is the one having the increasing slope gain characteristic with which the variation width of the gain is about 3 dB. FIG. 10 is a diagram illustrating an optical path of the optical signal inputted and outputted to and from the slope gain equalizer 101. With reference to FIG. 8 to FIG. 10, operations of the slope gain equalizer 101 according to the second example are described below.

In the slope gain equalizer 101 according to the second example, once an optical signal having the slope gain characteristic illustrated in FIG. 9 is inputted to the first optical fiber 7 (s1) as illustrated in FIG. 10, the optical signal is emitted from the first port P1 (s2) and also enters the interference filter 5 after being shaped into parallel light by the collimating lens 10a (s3). The optical signal that enters the interference filter 5 is transmitted through the interference filter 5 and the compensating interference filter 105 (s8→s21) and outputted from the third optical fiber via the third port P3 (s22→s23).

Then, in the slope gain equalizer 101 according to the second example, during the process of following the above-described optical path (s1→s2→s3→s8→s21→s21→s22→s23), the optical signal first obtains the gain characteristic of curving so as to protrude upward as illustrated in FIG. 6 by the interference filter 5. Next, the optical signal is transmitted through the compensating interference filter 105 having the gain characteristic of curving to protrude downward as illustrated in FIG. 8. With this, the optical signal is corrected to have the gain characteristic of being flat in a predetermined wavelength bandwidth as illustrated in FIG. 3B.

Note that, in a case of inputting an optical signal having a decreasing slope gain characteristic, as with the slope gain equalizer 1 according to the first example, the optical signal inputted from the first optical fiber 7 may be reflected by the interference filter 5 and outputted from the second optical fiber (s1→s2→s3→s4→s5→s6).

The slope gain equalizer 101 according to the second example substantially includes an interference filter having the optical characteristic illustrated in FIG. 2. That is, the slope gain equalizer 101 according to the second example can further enhance the flatness of the signal strength in a predetermined wavelength bandwidth regardless of the direction in which the slope gain characteristic of the inputted optical signal is inclined from the short wavelength side to the long wavelength side.

OTHER EXAMPLES

Figure 11:
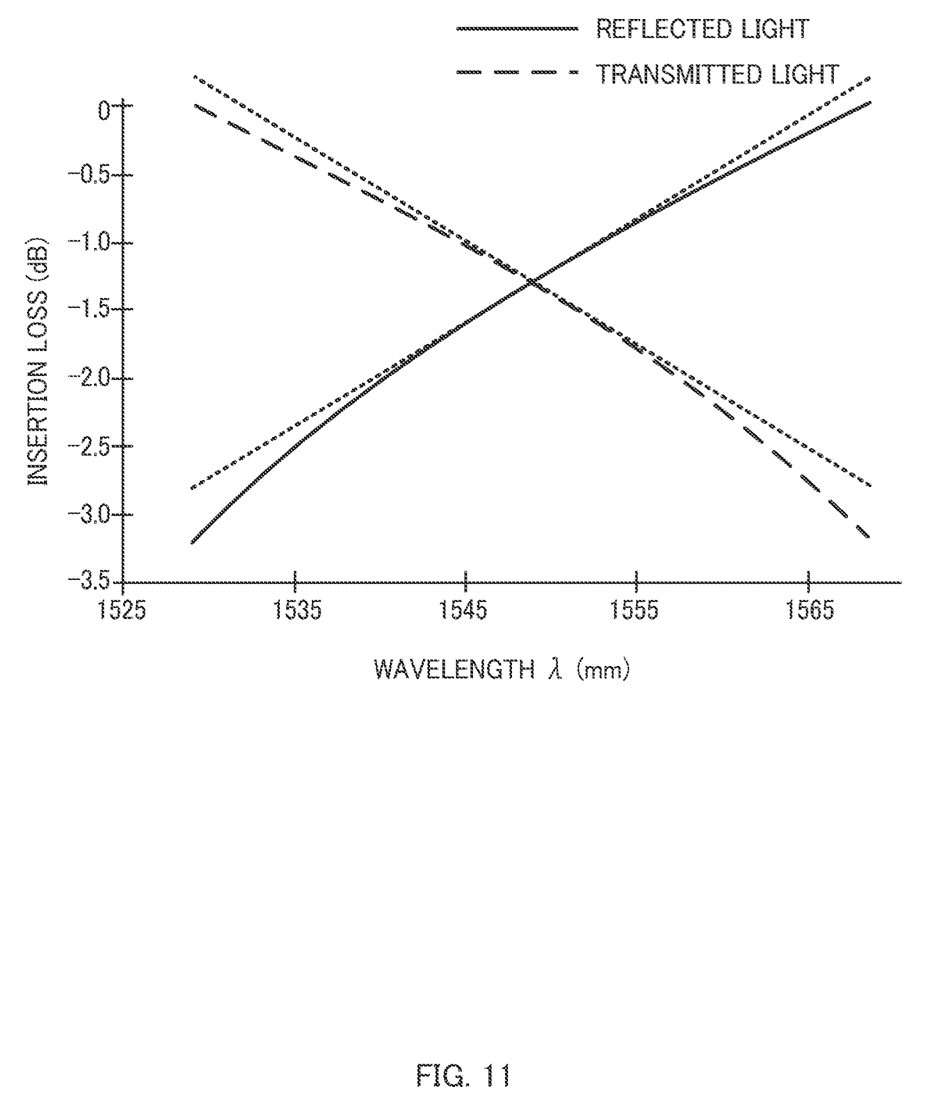
FIG. 11 is a diagram illustrating another example of the optical characteristic of the interference filter included in the slope gain equalizer according to the above-described first example.

As illustrated in FIG. 5, in the actual interference filter 5, if either one of the reflected light and the transmitted light has a linear optical characteristic, the optical characteristic of the other is not linear. For this reason, in the slope gain equalizer 1 according to the first example, the slope gain characteristic of the optical signal when the correction is performed by using the reflected light from the interference filter 5 and the slope gain characteristic of the optical signal when the correction is performed by using the transmitted light through the interference filter 5 are not symmetric. Therefore, as long as the variation of the gain in a predetermined wavelength bandwidth after the correction is within a defined range, as illustrated in FIG. 11, both the insertion loss of the reflected light (in FIG. 11, solid line) and insertion loss of the transmitted light (in FIG. 11, broken line) in the interference filter 5 may be curved with respect to a straight line (in FIG. 11, dotted line) to make the insertion losses of the reflected light and the transmitted light symmetric.

In the first and second examples, the optical signal is inputted from the first optical fiber 7, and for the optical signal having the decreasing slope gain characteristic, the reflected light from the interference filter 5 is outputted from the second optical fiber, and the transmitted light through the interference filter 5 or the transmitted light through the interference filter 5 and the compensating interference filter 105 is outputted from the third optical fiber 11. As a matter of course, the optical signal may be inputted from the second optical fiber 8 to be outputted from the first optical fiber 7, or the optical signal may be inputted from the third optical fiber 11 to be outputted from the first optical fiber 7. However, in the slope gain equalizers (1 and 101) according to the first and second examples, since the input route of the optical signal is certainly coupled to the first optical fiber 7 regardless of the slope direction of the slope gain characteristic of the inputted optical signal, the possibility of taking a wrong coupling relationship between the optical fibers (7, 8 and 11) and the input-output routes of the optical signal is less. Therefore, the slope gain equalizers (1 and 101) according to the first and second examples facilitate the disposing into an optical fiber communication system, and as a result, it is possible to further reduce the construction cost of the optical fiber communication system.

REFERENCE SIGNS LIST

1, 101 slope gain equalizer
2 housing
3, 4 optical fiber collimator
5 interference filter
6a, 6b sleeve
10a, 10b collimating lens
7, 8, 11 optical fiber
12 ferrule
100 optical axis
105 compensating interference filter

The invention claimed is:

1. A slope gain equalizer that corrects an inclined gain characteristic in an optical signal in a predetermined wavelength bandwidth, comprising:
   a dual-core fiber collimator that holds a first optical fiber and a second optical fiber;
   a single-core fiber collimator that holds a third optical fiber; and
   an interference filter, wherein
   the dual-core fiber collimator and the single-core fiber collimator are arranged to face each other on an optical axis,
   the interference filter is arranged between the dual-core fiber collimator and the single-core fiber collimator on the optical axis,
   when an optical signal of a predetermined bandwidth is inputted from the first optical fiber or the second optical fiber, the optical signal is reflected by the interference filter and is outputted from the second optical fiber or the first optical fiber,
   when the optical signal is inputted from the first optical fiber or the third optical fiber, the optical signal is transmitted through the interference filter and is outputted from the third optical fiber or the first optical fiber, a wavelength dependence of insertion loss in a reflecting direction in the predetermined wavelength bandwidth of the interference filter is sloped so as to increase or decrease gradually from a short wavelength side to a long wavelength side, a wavelength dependence of insertion loss in a transmitting direction in the predetermined wavelength bandwidth of the interference filter is sloped so as to decrease or increase gradually from a short wavelength side to a long wavelength side so as to slope in the opposite direction from the slope in the insertion loss of the reflecting direction, and the first to the third optical fibers are coupled to an input-output route of the optical signal such that a slope of a wavelength dependence of a gain characteristic in the optical signal and a slope of a wavelength dependence of the insertion loss in the interference filter are in opposite directions.

2. The slope gain equalizer according to claim 1, wherein
the interference filter and a compensating interference filter are arranged in this order on the optical axis from the dual-core fiber collimator to the single-core fiber collimator, and the wavelength dependence of insertion loss in the reflecting direction in the predetermined wavelength bandwidth of the interference filter is a straight line that increases or decreases gradually from the short wavelength side to the long wavelength side, the wavelength dependence of insertion loss in the transmitting direction in the predetermined wavelength bandwidth of the interference filter is a curved line that curves along a straight line that slopes in the opposite direction of the straight line in the insertion loss of the reflecting direction and gradually decreases or increases from the short wavelength side to the long wavelength side, and the compensating interference filter corrects the wavelength dependence of insertion loss in the transmitting direction at the interference filter to become a straight line sloping in the opposite direction from the insertion loss of the light reflected by the interference filter.

3. The slope gain equalizer according to claim 2, wherein
the first optical fiber is coupled to an input route of the optical signal.

4. The slope gain equalizer according to claim 1, wherein
the first optical fiber is coupled to an input route of the optical signal.

* * * * *